US007614850B2

(12) United States Patent
Rogall

(10) Patent No.: US 7,614,850 B2
(45) Date of Patent: Nov. 10, 2009

(54) APPARATUS FOR ASSEMBLING ROTARY MACHINES

(75) Inventor: Peter Rogall, Emsbüren (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/456,616

(22) Filed: Jul. 11, 2006

(65) Prior Publication Data
US 2008/0014088 A1 Jan. 17, 2008

(51) Int. Cl.
*F03D 1/06* (2006.01)
*F03D 11/00* (2006.01)
(52) U.S. Cl. .................. 416/155; 416/174; 416/204 R; 416/244 R; 416/245 R
(58) Field of Classification Search ............... 416/9–13, 416/155, 174, 204 R, 204 A, 205, 207–209, 416/244 R, 244 A, 245 R; 290/44, 55
See application file for complete search history.

(56) References Cited

U.S. PATENT DOCUMENTS

| 2,473,899 | A | * | 6/1949 | Murphy ..................... 416/147 |
| 2,645,294 | A | * | 7/1953 | Douthett ..................... 416/155 |
| 2,765,859 | A | * | 10/1956 | Hartzell et al. ............. 416/207 |
| 4,557,666 | A | | 12/1985 | Baskin et al. |
| 4,565,929 | A | | 1/1986 | Baskin et al. |
| 6,232,673 | B1 | * | 5/2001 | Schoo et al. ................... 290/55 |
| 6,327,957 | B1 | | 12/2001 | Carter, Sr. |
| 6,872,049 | B2 | | 3/2005 | Christensen |
| 6,951,443 | B1 | | 10/2005 | Blakemore |
| 6,991,378 | B2 | * | 1/2006 | Jacquemont et al. ......... 416/174 |
| 7,059,822 | B2 | * | 6/2006 | LeMieux et al. ............. 415/4.3 |
| 7,182,575 | B2 | | 2/2007 | Grabau |
| 7,470,111 | B2 | * | 12/2008 | Schubert ..................... 416/155 |
| 2005/0254949 | A1 | * | 11/2005 | Schubert ................. 416/170 R |
| 2007/0114798 | A1 | * | 5/2007 | Cairo .......................... 290/44 |

FOREIGN PATENT DOCUMENTS

WO WO 2004/090326 A1 * 10/2004

* cited by examiner

*Primary Examiner*—Christopher Verdier
(74) *Attorney, Agent, or Firm*—James McGinness, Esq.; Armstrong Teasdale LLP

(57) ABSTRACT

A wind turbine generator includes at least one blade and a hub assembly. The hub assembly includes at least one substantially cylindrical wall defining a substantially annular hub cavity. The assembly also includes at least one substantially triangular frame inserted into the hub cavity and is fixedly coupled to the cylindrical wall. The assembly further includes at least one blade attachment apparatus having at least one blade support sleeve fixedly coupled to at least a portion of the cylindrical wall. The sleeve is configured to receive at least a portion of the wind turbine blade. The blade attachment apparatus also includes at least one blade pitch bearing having a blade portion and a hub portion. The hub portion is slidingly engaged with the blade portion blade portion and the blade portion is positioned radially outboard of the hub portion.

16 Claims, 5 Drawing Sheets

APPARATUS FOR ASSEMBLING ROTARY MACHINES

BACKGROUND OF THE INVENTION

This invention relates generally to rotary machines and more particularly, to apparatus for assembling wind turbine hub assemblies.

Generally, a wind turbine generator includes a turbine that has a rotatable hub assembly having multiple blades. The hub assembly is coupled to a rotor. The blades transform mechanical wind energy into a mechanical rotational torque that drives one or more generators via the rotor. The generators are generally, but not always, rotationally coupled to the rotor through a gearbox. The gearbox steps up the inherently low rotational speed of the rotor for the generator to efficiently convert the rotational mechanical energy to electrical energy, which is fed into a utility grid. Gearless direct drive wind turbine generators also exist. The rotor, generator, gearbox and other components are typically mounted within a housing, or nacelle, that is positioned on top of a base that may be a truss or tubular tower.

Some known hub assembly configurations introduce substantial weight at the top of the wind turbine tower in order to facilitate effective energy transfer from the wind to the blades and, subsequently, to the rotor. The associated load support features of the nacelles that support the hub assemblies further facilitate increased weight at the top of the wind tower. However, the increased weight of the wind turbine generators may increase capital and operational costs.

BRIEF DESCRIPTION OF THE INVENTION

In one aspect, a wind turbine generator is provided. The wind turbine generator includes at least one wind turbine blade and a hub assembly. The hub assembly includes at least one substantially cylindrical wall defining a substantially annular hub cavity. The assembly also includes at least one substantially triangular frame inserted into the hub cavity and is fixedly coupled to the cylindrical wall. The assembly further includes at least one blade attachment apparatus having at least one blade support sleeve fixedly coupled to at least a portion of the cylindrical wall. The sleeve is configured to receive at least a portion of the wind turbine blade.

In another aspect, a hub assembly for a rotary machine is provided. The assembly includes at least one substantially cylindrical wall defining a substantially annular hub cavity. The assembly also includes at least one substantially triangular frame inserted into the hub cavity and is fixedly coupled to the cylindrical wall.

In a further aspect, a blade attachment apparatus for a wind turbine is provided. The wind turbine has a hub assembly. The apparatus includes at least one blade support sleeve fixedly coupled to at least a portion of the hub assembly. The sleeve is configured to receive at least a portion of a wind turbine blade.

DETAILED DESCRIPTION OF THE INVENTION

Figure 1:
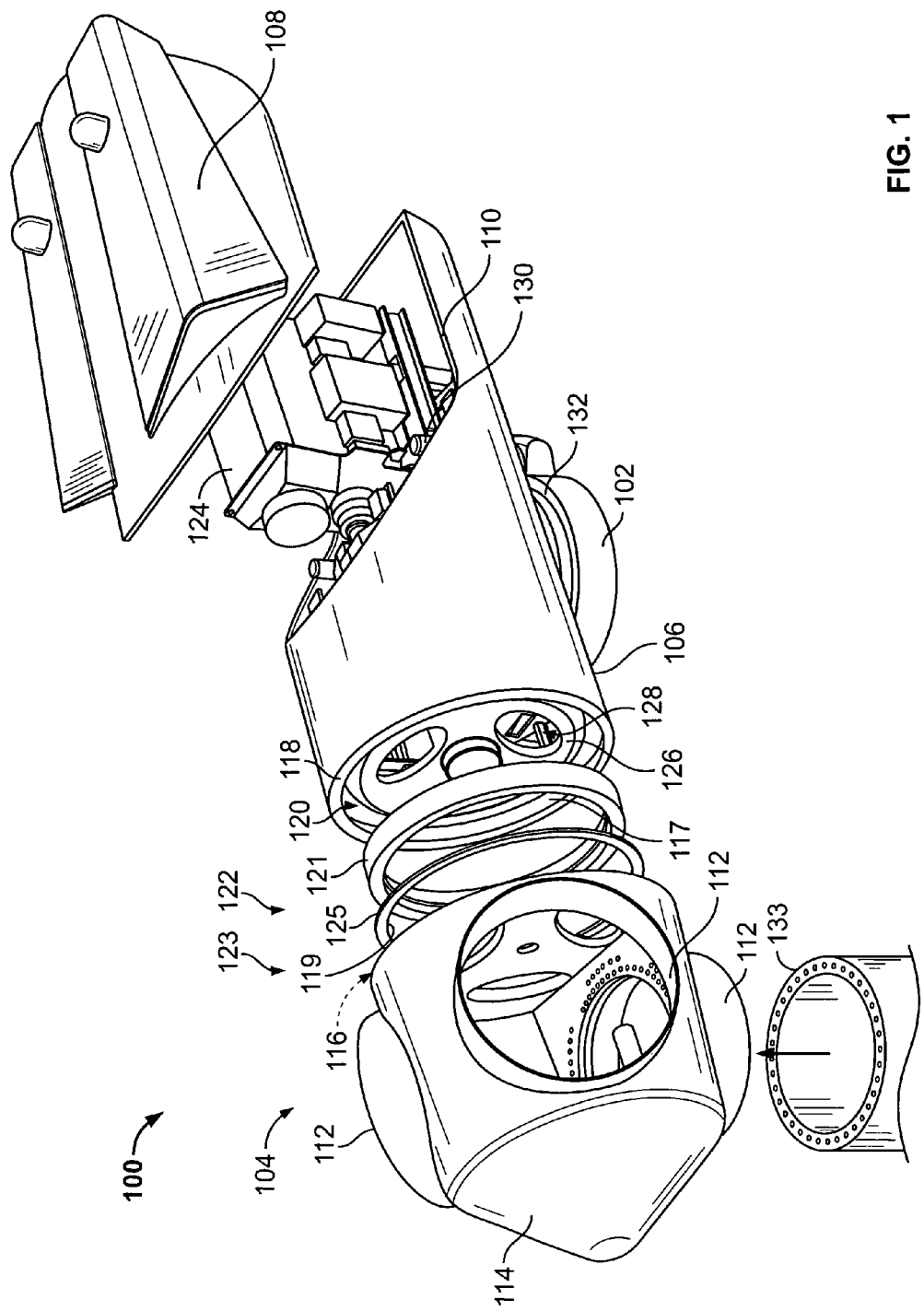
FIG. 1 is an exploded schematic view of an exemplary wind turbine generator.

FIG. 1 is an exploded schematic view of an exemplary wind turbine generator 100. In the exemplary embodiment, wind turbine generator 100 is a horizontal axis wind turbine. Alternatively, wind turbine 100 may be a vertical axis wind turbine. Also, alternatively, wind turbine 100 may be a 1.5 Megawatt (MW)-series or a 2.5 MW-series wind turbine generator commercially available from General Electric Company, Schenectady, N.Y. Further, alternatively, wind turbine 100 may be any wind turbine generator that the invention described herein may be embedded. Wind turbine 100 includes a mounting fixture 102 extending from either a tower or a supporting surface (neither shown in FIG. 1). In the event that a tower is used, a height of the tower is selected based upon factors and conditions known in the art. Wind turbine 100 also includes a hub assembly 104, a shell 106, a cover assembly 108, and a main frame 110. Shell 106 is fixedly coupled to main frame 110 and cover assembly 108 is removably coupled to main frame 110. Hub assembly 104 is removably coupled to shell 106. Hub assembly 104, shell 106, cover assembly 108 and main frame 110 cooperate to facilitate load support and load distribution within wind turbine 100. Cover assembly 108 includes an integrated cooling system (not shown in FIG. 1) that facilitates maintaining wind turbine 100 components within hub 104, shell 106 and cover 108 within predetermined operational temperature parameters.

Hub 104 includes at least one blade support sleeve 112 disposed substantially equidistantly circumferentially about hub 104. In the exemplary embodiment, wind turbine 100 has three blade support sleeves 112. Alternatively, rotor 108 may have more or less than three blade support sleeves 112. Also, in the exemplary embodiment, sleeves 112 are substantially cylindrical members coupled to and extending radially outward from hub 104. Alternatively, sleeves 112 may be of any configuration that facilitates predetermined operational parameters of wind turbine 100. Hub 104 also includes a nose element 114 that facilitates an aerodynamic efficiency of wind turbine 100. Hub 104 is coupled to shell 106 via a hub face plate 116 and a frame mating surface 118. A substantially annular interior surface portion 117 of shell 106 and plate 116 at least partially define a cavity 120 when plate 116 and surface 118 are coupled. A main bearing 122 and a support member 123 are positioned within cavity 120. Bearing 122 facilitates radial support and alignment of hub 104 and includes a radially outermost surface 121. Member 123 facilitates support and alignment of bearing 122 within wind turbine 100 and includes a radially inner surface 119 and a radially outer surface 125. Surface 119 is coupled to surface 121 via a friction fit prior to bearing 122 and member 123 positioning within cavity 120. Surface 125 is coupled to surface 117 via a friction fit upon positioning bearing 122 and member 123 within cavity 120.

Wind turbine generator 100 further includes a generator 124 that facilitates converting wind energy as captured by hub assembly 104 and generating electrical energy for subsequent transmission to an electrical distribution system (not shown in FIG. 1). A rotor (not shown in FIG. 1) is rotatably coupled to hub 104 and extends to generator 124. The rotor is coupled to a rotatable exciter (not shown in FIG. 1) that is disposed within generator 124. In the exemplary embodiment, generator 124 is a direct-drive generator, i.e., hub 104 drives generator 124 exciter directly via the rotor. Alternatively, a gearbox (not shown in FIG. 1) is positioned between hub assembly 104 and generator 124 within shell 106 and is used to step up a rotational speed generated by hub 104 to a generator 124 exciter speed that is substantially synchronous.

In the exemplary embodiment, a hub-to-gearbox/hub-to-direct-drive generator connector 126 is also disposed within cavity 120. Connector 126 facilitates radial support and alignment of the rotor from hub 104 to generator 124 (in the exemplary embodiment) or to a gear box (in an alternative embodiment). Connector 126 includes a plurality of passages 128 that facilitate personnel and material transport between hub 104 and the portions of wind turbine 100 defined within shell 106 and cover 108. Some alternative embodiments of wind turbine 100 exclude connector 126.

Blade support sleeves 112 are each configured to receive a wind turbine blade 133. In the exemplary embodiment, hub 104 receives at least one wind turbine blade 133, or more specifically, three blades 133. In an alternative embodiment, hub 104 receives any number of blades 133 that facilitates attaining predetermined operational parameters of wind turbine 100. The blades 133 are positioned about hub 104 to facilitate rotating hub 104 to transfer kinetic energy from the wind into usable mechanical energy via the rotor, and subsequently, electrical energy within generator 124. In the exemplary embodiment, the blades 133 have a length between 50 meters (m) (164 feet (ft)) and 100 m (328 ft). Alternatively, blades 133 may have any length that attains predetermined operational parameters of wind turbine 100.

Wind turbine 100 also includes a yaw adjustment mechanism 130 that may be used to rotate wind turbine 100 on an axis (not shown in FIG. 1) to control the perspective of wind turbine 100 with respect to the direction of the wind. Mechanism 130 is coupled to main frame 110 and to a yaw bearing 132 and at least one yaw drive gear (not shown in FIG. 1) wherein bearing 132 and the drive gear are coupled to mounting fixture 102. Bearing 132 facilitates support and alignment of wind turbine 100 during yaw adjustment operations.

In some configurations, one or more microcontrollers in a control system (not shown in FIG. 1) are used for overall system monitoring and control including pitch and yaw adjustments, rotor speed regulation, yaw brake application, and fault monitoring. Alternatively, distributed or centralized control architectures are used in alternate embodiments of wind turbine 100.

Figure 2:
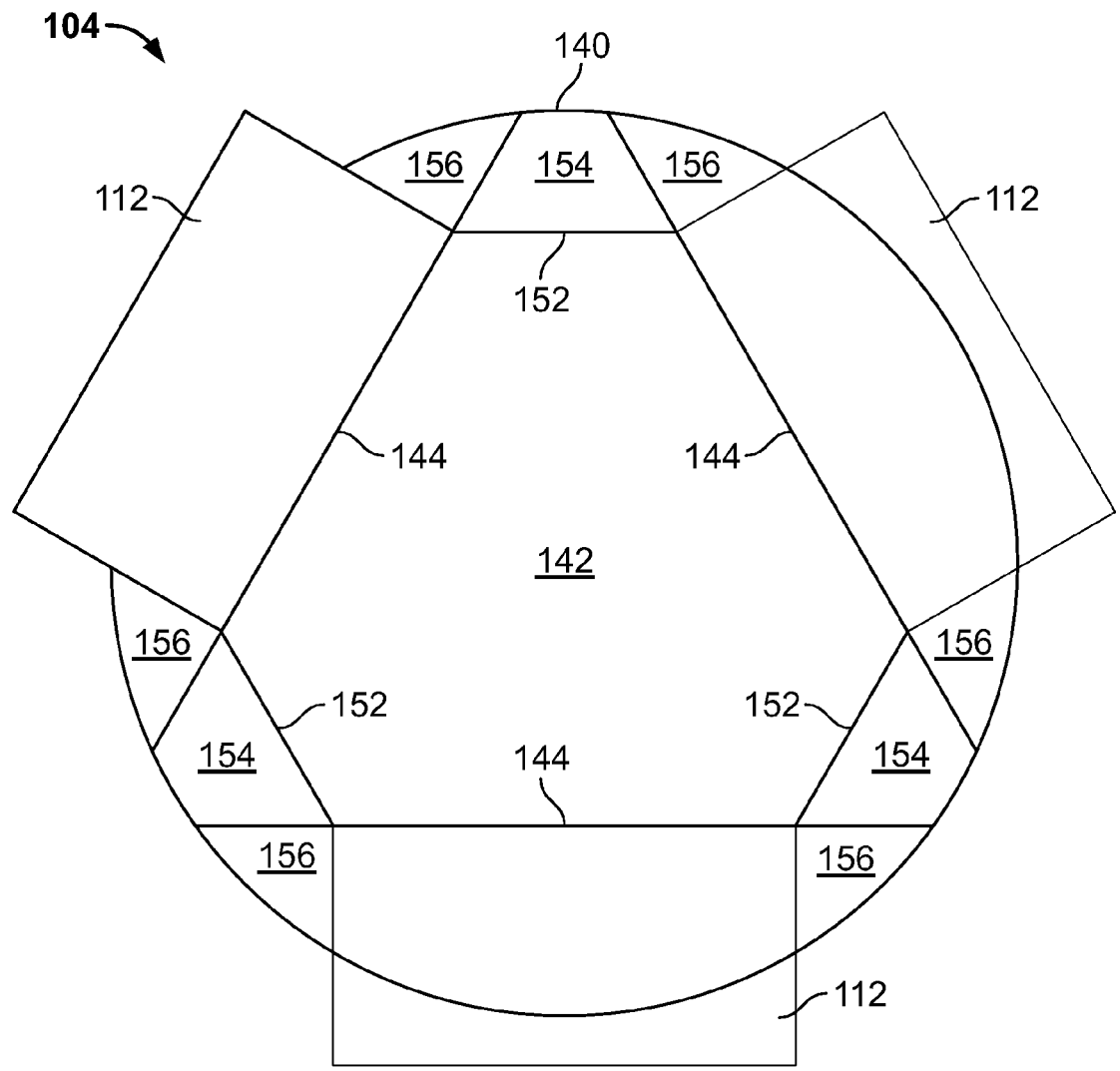
FIG. 2 is a cross-sectional schematic axial view of an exemplary hub assembly that may be used with the wind turbine generator shown in FIG. 1.
Figure 3:
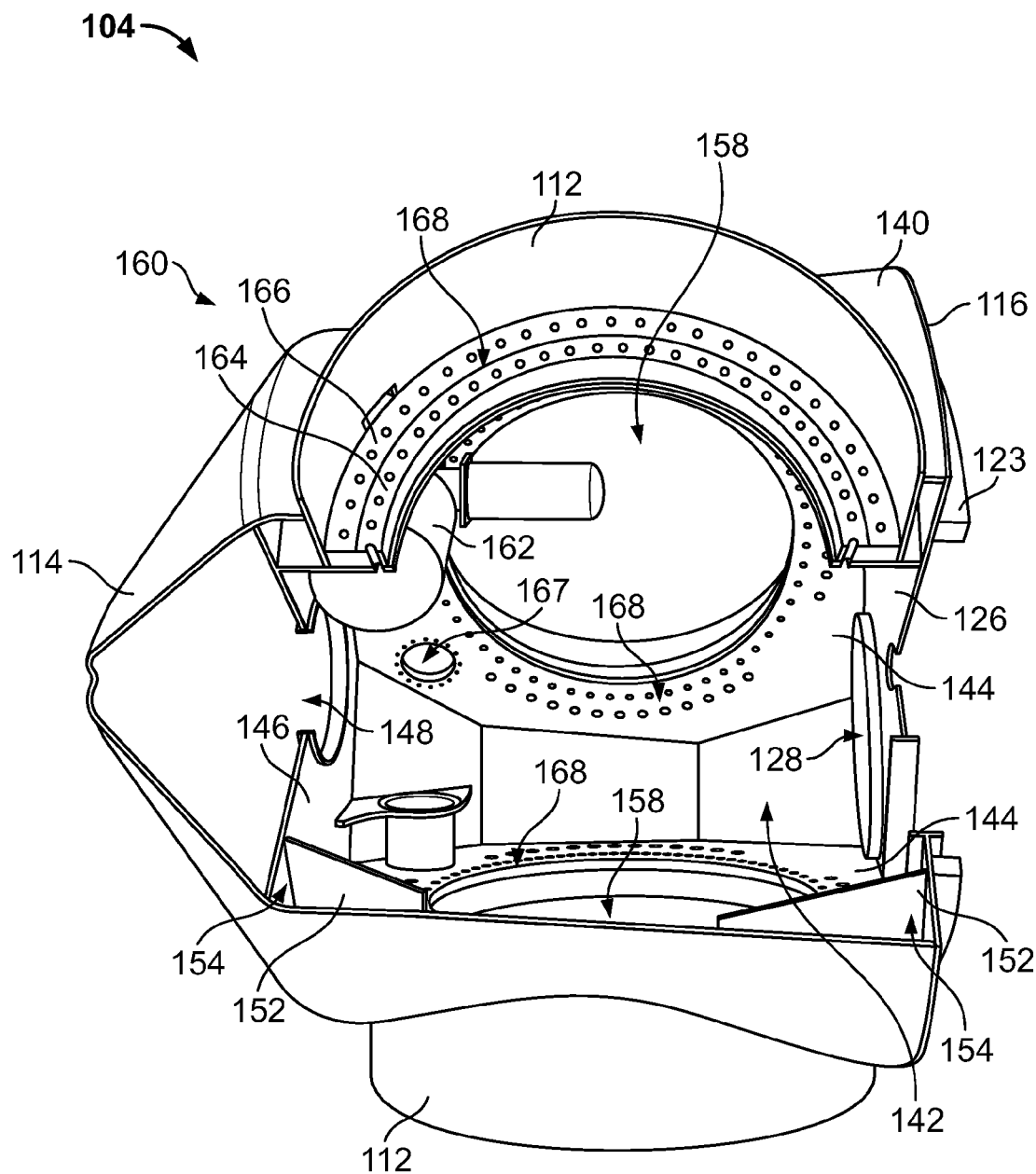
FIG. 3 is a cross-sectional schematic side view of the hub assembly shown in FIG. 2.
Figure 4:
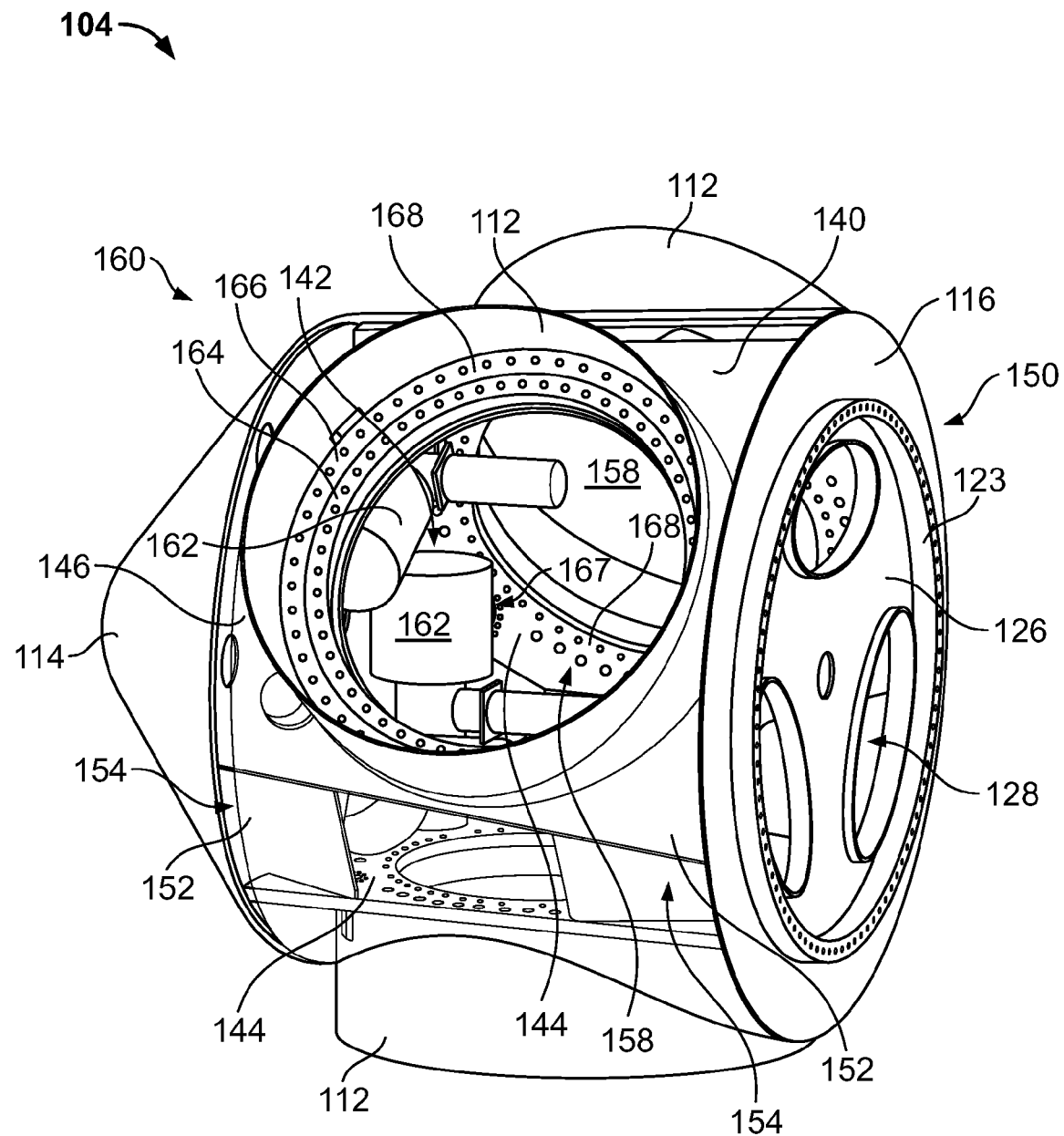
FIG. 4 is a skewed cross-sectional schematic side view of the hub assembly shown in FIG. 3.

FIG. 2 is a cross-sectional schematic view of exemplary hub assembly 104 that may be used with the wind turbine generator shown in FIG. 1. FIG. 3 is a cross-sectional schematic side view of hub assembly 104 and FIG. 4 is a skewed cross-sectional schematic side view of hub assembly 104. Hub 104 includes a substantially cylindrical outer wall 140 fixedly coupled to nose element 114. Nose 114 and wall 140 define a hub cavity 142. Hub 104 also includes a plurality of polygonal blade flange plates 144 fixedly coupled to wall 140. Plates 144 are configured within cavity 142 in a substantially triangular configuration wherein at least one of plates 144 is substantially parallel to main frame 110. In the exemplary embodiment, plates 144 and wall 140 are formed individually by methods that include, but are not limited to, forging and casting. Moreover, in the exemplary embodiment, plates 144 are welded to wall 140 within cavity 142. Alternatively, plates 144 are coupled to wall 140 via methods that include, but are not limited to, retention hardware, such as bolts and nuts, and sealing methods and apparatus known in the art. Further, alternatively, hub 104 is formed with plates 144 integral to wall 140 via methods that include, but are not limited to, casting and forging. Hub 104 further includes a substantially circular front flange plate 146 that is positioned in a forward portion, i.e., a nose 114 end, of hub 104 opposite to substantially circular rear flange plate 116 that is positioned in an aft portion, i.e., a generator 124 end, of hub 104. Plate 146 defines a substantially circular passage 148 that facilitates personnel and material transit into an interior of nose 114. In the exemplary embodiment, plate 146 is formed via methods that include, but are not limited to, casting and forging and is welded to wall 140. Alternatively, plate 146 is coupled to wall 140 via methods that include, but are not limited to, retention hardware, such as bolts and nuts, and sealing methods and apparatus known in the art. Further, alternatively, plate 146 is formed integrally with hub 104 via methods that include, but are not limited to, casting and forging. Hub face plate 116 is substantially annular and includes a passage 150 configured to receive substantially annular support plate 123 and connector 126. Some alternative embodiments of wind turbine 100 exclude connector 126. In the exemplary embodiment, plate 116 is formed via methods that include, but are not limited to, casting and forging and is welded to wall 140. Alternatively, plate 116 is coupled to wall 140 via methods that include, but are not limited to, retention hardware, such as bolts and nuts, and sealing methods and apparatus known in the art. Further, alternatively, plate 116 is formed integrally with hub 104 via methods that include, but are not limited to, casting and forging.

Hub 104 further includes a plurality of support plates 152. In the exemplary embodiment, six plates 152 are positioned within cavity 142, i.e., three of plates 152 are positioned on the nose 114 end of hub 104 and three plates 152 are positioned on the generator 124 end of hub 104. Each of plates 152 is polygonal with at least four circumferential sides. With respect to the three plates 152 that are positioned on the nose 114 end of hub 104, one end of each plate 152 is coupled to a radially inner portion of plate 146. An opposing side of each plate 152 is coupled to wall 140. The remaining two sides of plate 152 are coupled to each of two adjacent flange plates 144 such that a cavity 154 is defined by each of plates 152, wall 140, plates 144 and plate 146. Similarly, for the three plates 152 positioned on the generator 124 end of hub 104, one end of plates 152 are coupled to a radially inner portion of rear flange plate 116. An opposing side of each plate 152 is coupled to wall 140. The remaining two sides of plate 152 are coupled to each of two adjacent flange plates 144 such that a cavity 154 is defined by each of plates 152, wall 140, plates 144 and plate 116. In the exemplary embodiment, plates 152 are formed via methods that include, but are not limited to, casting and forging and are welded to wall 140, flange plates 144, and/or plates 146 and 116. Alternatively, plates 152 are coupled to wall 140, flange plates 144, and/or plates 146 and 116 via methods that include, but are not limited to, retention hardware, such as bolts and nuts, and sealing methods and apparatus known in the art. Further, alternatively, plates 152 are formed integrally with hub 104 via methods that include, but are not limited to, casting and forging.

In the exemplary embodiment, support sleeves 112 are formed via methods that include, but are not limited to, casting and forging and are welded to wall 140 and flange plates 144. Alternatively, support sleeves 112 are coupled to wall 140 via methods that include, but are not limited to, retention hardware, such as bolts and nuts, and sealing methods and apparatus known in the art. Further, alternatively, sleeves 112 are formed integrally with hub 104 via methods that include, but are not limited to, casting and forging. Support sleeves 112 facilitate support and alignment of the blades. Support sleeves 112, wall 140 and plates 144 define a plurality of cavities 156.

Such methods and apparatus for assembling hub assembly 104 as described above, sometimes referred to as double-wall construction, facilitates increased load bearing and load transfer characteristics of hub 104 due to the reinforcing characteristics of sleeves 112, wall 140, and plates 144, 146, 116, and 152. Moreover, in the exemplary embodiment, lightweight materials that include, but are not limited to, aluminum alloys and ceramic composites, are used to fabricate many of the hub 104 components as described herein. Therefore, such methods and apparatus for assembling hub assembly 104 as described above, including defining cavities 154 and 156, facilitate decreasing the weight of hub 104.

Each of blade flange plates 144 define, but does not extend into, a substantially annular passage 158 that is configured to receive a blade pitch bearing 160 and a blade (not shown). Support tubes 112 facilitate support and alignment of the blades within passage 158. At least one pitch drive mechanism 162 modulates the pitch of the blades along a pitch axis (not shown). Generally, each blade receives one mechanism 162. As such, the blades may deflect and/or rotate from a neutral, or non-deflected, position to a deflected position and facilitate increasing or decreasing the blades rotational speed by adjusting the surface area of the blades exposed to the wind force vectors. In the exemplary embodiment, the pitches of the blades are controlled individually. However, in some embodiments the pitch of two or more blades may be controlled as a group. Bearing 160 facilitates pitch movements of the blades as well as supports and aligns the blades within passage 158.

Bearings 160 include a stationary, radially inner hub portion 164 and a rotating, radially outer blade portion 166. In the exemplary embodiment, portion 164 is coupled to at least one of blade flange plates 144 via methods that include, but are not limited to, retention hardware such as bolts and nuts (not shown). Alternatively, portion 164 is coupled to at least one of blade flange plates 144 via methods that include, but are not limited to, welding. Portion 166 is slidingly coupled to portion 164 and support tube 112 and the blade is coupled to portion 166 via methods that include, but are not limited to, retention hardware such as bolts and nuts. Each of bearings 160 also include a bearing blocking device (not shown) that is positioned within a bearing blocking device passage 167. The blocking device facilitates maintaining the associated blade substantially stationary during activities that include, but are not limited to, maintenance outages.

In order to facilitate access to the retention hardware from within hub cavity 142, a plurality of hardware passages 168 is formed within flange plates 144, inner portion 164 and outer portion 166 and configured to permit such access. Moreover, positioning bearing 160 within passage 158 to permit access from within hub cavity 142 facilitates a reduction of potential for release of lubricating materials external to hub 104.

Figure 5:
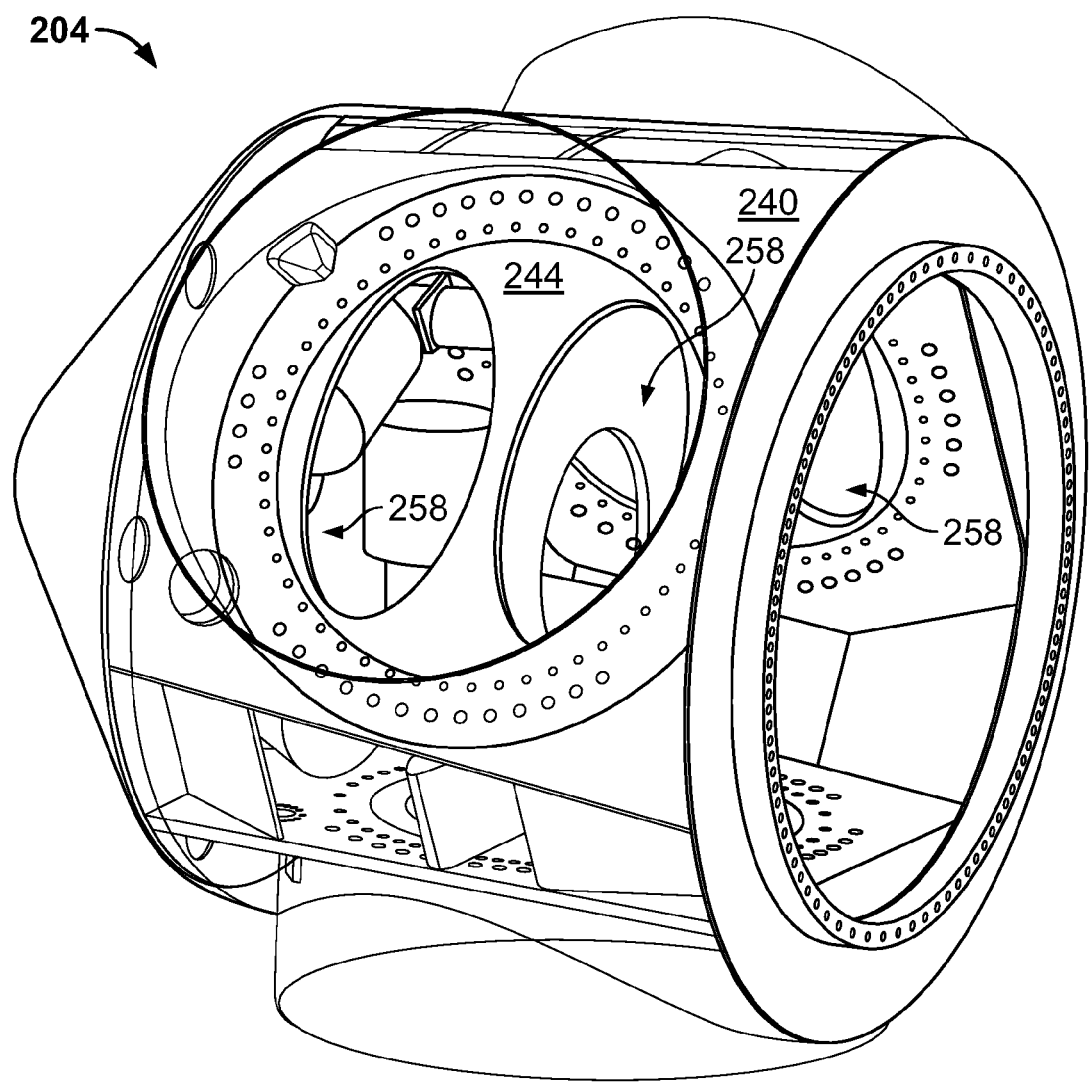
FIG. 5 is a skewed cross-sectional schematic side view of an alternative hub assembly that may be used with the wind turbine generator shown in FIG. 1.

FIG. 5 is a skewed cross-sectional schematic side view of an alternative hub assembly 204 that may be used with wind turbine generator 100 (shown in FIG. 1). Assembly 204 is substantially similar to assembly 104 (shown in FIGS. 1, 2, 3, and 4) with the exception that a plurality of alternative polygonal blade flange plates 244 are fixedly coupled to an alternative substantially cylindrical wall 240. In the alternative embodiment, plates 244 are extended to form two blade flange plate passages 258 for each blade 133 (shown in FIG. 1). Also, in the alternative embodiment, the blades 133 are configured with two extended prongs (not shown) that are configured to be received within passages 258. Further alternative embodiments include any number of passages 258 that facilitate operation of wind turbine 100 as described herein.

The methods and apparatus for a wind turbine generator hub assembly described herein facilitate operation of a wind turbine generator. More specifically, the wind turbine generator hub assembly as described above facilitates an efficient and effective energy conversion scheme. Also, the robust hub assembly facilitates increased load bearing and load transfer characteristics. Moreover, the hub assembly facilitates decreasing the weight of the wind turbine generator. Such hub assembly also facilitates wind turbine generator reliability, and reduced maintenance costs and wind turbine generator outages.

Exemplary embodiments of wind turbine hub assemblies as associated with wind turbine generators are described above in detail. The methods, apparatus and systems are not limited to the specific embodiments described herein nor to the specific illustrated wind turbine generators.

While the invention has been described in terms of various specific embodiments, those skilled in the art will recognize that the invention can be practiced with modification within the spirit and scope of the claims.

What is claimed is:

1. A wind turbine generator comprising:
at least one wind turbine blade; and
a hub assembly comprising:
   a substantially cylindrical wall defining a hub cavity;
   at least one substantially triangular frame inserted into said hub cavity, wherein said at least one substantially triangular frame comprises a plurality of flange plates fixedly coupled to said cylindrical wall, said plurality of flange plates defining, but not extending into, at least one passage, said plurality of flange plates comprising:
      a plurality of blade flange plates coupled to said cylindrical wall;
      a front flange plate coupled to said cylindrical wall;
      a rear flange plate coupled to said cylindrical wall; and
      a plurality of support plates coupled to said cylindrical wall, said plurality of blade flange plates, said front flange plate, and said rear flange plate;
   at least one blade attachment apparatus comprising at least one blade support sleeve fixedly coupled to at least a portion of said cylindrical wall, said at least one blade support sleeve configured to receive at least a portion of said wind turbine blade; and
   a blade pitch bearing comprising a blade portion and a hub portion that is slidingly coupled to said blade portion.

2. A wind turbine generator in accordance with claim 1 wherein said plurality of flange plates define a plurality of passages and a plurality of cavities, each of said passages is configured to receive said blade pitch bearing.

3. A wind turbine generator in accordance with claim 1 wherein said blade portion is positioned radially outboard of said hub portion and said hub portion is stationary and fixedly coupled to at least one of said plurality of blade flange plates.

4. A wind turbine generator in accordance with claim 1 wherein said blade portion is slidingly engaged with said support sleeve, is rotatably coupled to a blade pitch drive mechanism, and is configured to receive said blade.

5. A wind turbine generator in accordance with claim 1 wherein said support sleeve comprises a substantially cylindrical member coupled to and extending radially outward from said cylindrical wall.

6. A hub assembly for a rotary machine comprising:
a substantially cylindrical wall defining a hub cavity;

at least one substantially triangular frame inserted into said hub cavity, wherein said at least one substantially triangular frame comprises a plurality of flange plates fixedly coupled to said cylindrical wall, said plurality of flange plates defining, but not extending into, at least one passage, said plurality of flange plates comprising:
a plurality of blade flange plates coupled to said cylindrical wall;
a front flange plate coupled to said cylindrical wall;
a rear flange plate coupled to said cylindrical wall; and
a plurality of support plates coupled to said cylindrical wall, said plurality of blade flange plates, said front flange plate, and said rear flange plate; and
a blade pitch bearing comprising a blade portion and a hub portion that is slidingly coupled to said blade portion.

7. A hub assembly in accordance with claim 6 wherein said plurality of flange plates define a plurality of passages and a plurality of cavities.

8. A hub assembly in accordance with claim 7 wherein at least one of said plurality of passages is configured to receive said blade pitch bearing.

9. A hub assembly in accordance with claim 8 wherein said blade pitch bearing comprises a stationary portion coupled to a structural member.

10. A hub assembly in accordance with claim 7 wherein said plurality of passages are access passages.

11. A hub assembly in accordance with claim 6 further comprising at least one blade support sleeve coupled to at least a portion of said wall.

12. A blade attachment apparatus for a wind turbine, the wind turbine having a hub assembly, said apparatus comprising:

a plurality of flange plates fixedly coupled to at least a portion of the hub assembly, said plurality of flange plates comprising:
a plurality of blade flange plates;
a front flange plate;
a rear flange plate; and
a plurality of support plates coupled to said plurality of blade flange plates, said front flange plate, and said rear flange plate;
at least one blade support sleeve fixedly coupled to at least a portion of said plurality of flange plates, said sleeve and said plurality of flange plates cooperate to define, but not extend into, at least one passage, said sleeve configured to receive at least a portion of a wind turbine blade to facilitate aligning the wind turbine blade relative to said sleeve; and
a blade pitch bearing comprising a blade portion and a hub portion that is slidingly coupled to said blade portion.

13. A blade attachment apparatus in accordance with claim 12 wherein said support sleeve comprises a substantially cylindrical wall coupled to and extending radially outward from the hub assembly.

14. A blade attachment apparatus in accordance with claim 12 wherein said hub portion is stationary, fixedly coupled to the hub assembly, and comprises retention hardware passages accessible from within the hub assembly.

15. A blade attachment apparatus in accordance with claim 12 wherein said blade portion is slidingly engaged with said support sleeve, is rotatably coupled to a blade pitch drive mechanism, and is configured to receive a blade.

16. A blade attachment apparatus in accordance with claim 12 wherein said blade portion is positioned radially outboard of said hub portion.

* * * * *